United States Patent [19]
Mochizuki et al.

[11] Patent Number: 4,561,943
[45] Date of Patent: Dec. 31, 1985

[54] PROCESS FOR PREPARING SURFACE-TREATED STEEL STRIPS ADAPTED FOR ELECTRIC RESISTANCE WELDING AND STRIPS PRODUCED BY SAID PROCESS

[75] Inventors: Kazuo Mochizuki; Hisatada Nakakoji; Toshio Ichida; Toshio Irie; Hajime Ogata; Kyoko Yamaji, all of Chiba, Japan

[73] Assignee: Kawasaki Steel Corporation, Kobe, Japan

[21] Appl. No.: 628,265

[22] Filed: Jul. 6, 1984

[30] Foreign Application Priority Data

Jul. 8, 1983 [JP] Japan .................. 58-124235
Nov. 26, 1983 [JP] Japan .................. 58-222372

[51] Int. Cl.$^4$ ............................. C25D 5/12
[52] U.S. Cl. ..................... 204/28; 204/37.3; 204/40; 204/41
[58] Field of Search ............ 204/28, 37 T, 38 B, 204/27, 40, 41

[56] References Cited

U.S. PATENT DOCUMENTS 2,266,330 12/1941 Nachtman .................. 204/37.5
4,411,961 10/1983 Tremmel .................. 204/41

FOREIGN PATENT DOCUMENTS 51-43324 1/1976 Japan .................. 204/38.4
0015433 2/1979 Japan .................. 204/28
0061837 12/1982 Japan .................. 204/38.4

Primary Examiner—Andrew H. Metz
Assistant Examiner—Terryence Chapman
Attorney, Agent, or Firm—Young & Thompson

[57] ABSTRACT

Surface-treated steel strips suitable for electric resistance welding are prepared by forming a first layer of iron-nickel alloy on a steel strip, this first layer having a weight ratio of Ni/(Fe+Ni) in the range between 0.02 and 0.50 and a thickness of 10 to 5,000 angstroms, forming a second layer of tin or iron-tin-nickel alloy on the first layer by tin plating to a coating weight of 0.1 to 1 g/m$^2$ of tin and optionally, causing the tin to reflow. A third layer is formed on the second layer by effecting an electrolytic chromate treatment, this third layer consisting essentially of metallic chromium and hydrated chromium oxide in a total amount of 5 to 20 mg/m$^2$ calculated as elemental chromium. Preferably, the electrolytic chromate treatment is controlled so that at least 2 mg/m$^2$ of metallic chromium is present in the third layer.

21 Claims, 3 Drawing Figures

1μm

FIG. 1
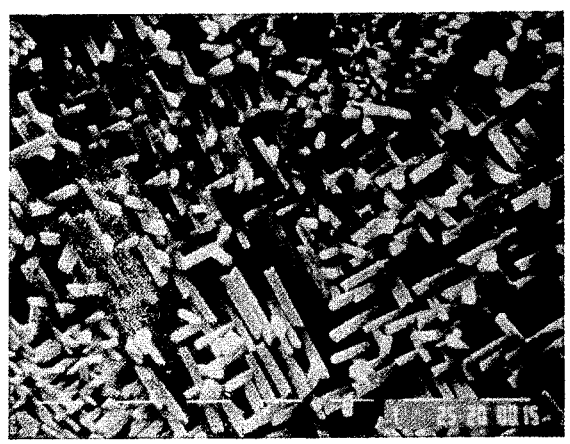
FIG. 2    |⎯⎯| 1μm
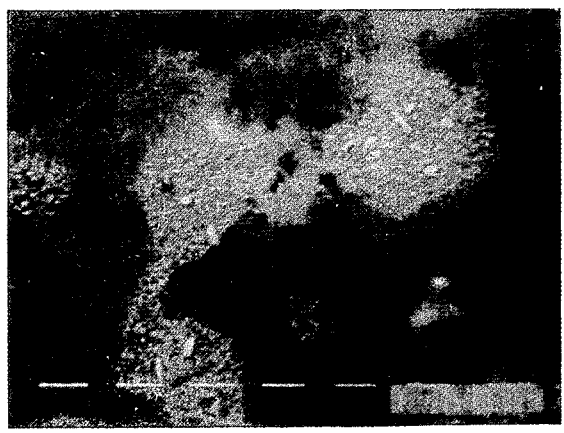
|⎯⎯| 1μm

PROCESS FOR PREPARING SURFACE-TREATED STEEL STRIPS ADAPTED FOR ELECTRIC RESISTANCE WELDING AND STRIPS PRODUCED BY SAID PROCESS

This invention relates to a process for preparing surface-treated steel strips adapted for electric resistance welding, and more particularly, to a process for preparing surface-treated steel strips having such improved weldability as to permit can bodies to be joined into food cans by electric resistance welding as well as improved corrosion resistance after lacquer coating.

BACKGROUND OF THE INVENTION

Among food can-forming materials there have been most widely used tin-coated steel strips generally called tin plates. In order to join the mating edges of a can body, conventional soldering techniques were previously used. Because of the toxicity of lead contained in conventional solder, pure tin solder has recently become prevalent. The pure tin solder, however, has a technical problem in making a joint because of inferior wetability during the soldering process and is so expensive as to create the economic problem of increased manufacture cost.

On the other hand, in recent years, food containers have enjoyed the development of inexpensive, competitive materials such as polyethylene, aluminum, glass, processed paper and the like. Despite their significantly improved corrosion resistance among others advantages, tin plate cans having expensive tin thickly coated thereon to a coating weight of as great as 2.8 to 11.2 $g/m^2$ require a relatively high cost of manufacture and have encountered severe competition.

In order to overcome the above-described drawbacks of tinplate cans, electric resistance welding of can bodies has recently replaced the conventional soldering technique and become widespread. There is the need for can-forming steel compatible with electric resistance welding.

In addition to tinplate discussed above, tin-free steel of chromium type is another typical example of conventional can-forming steel. The tin-free steel is prepared by carrying out an electrolytic chromate treatment on steel to form a layer of metallic chromium and hydrated chromium oxides on the surface. Since the relatively thick hydrated chromium oxide film on the surface has a relatively high electric resistance, the chromated steel is ineffectively welded to form a weld of insufficient strength and thus unsuitable as welded can-forming steel despite its economic advantage.

Since other can-forming materials are also inadequate as welded can-forming material, a variety of proposals have been made. One example is nickel-plated steel, typically "Nickel-Lite" announced by National Steel Corporation of the U.S. which is prepared by plating a steel strip with nickel to a thickness of about 0.5 $g/m^2$ followed by a conventional chromate treatment. Inferior adhesion of lacquer has limited the spread of this nickel-plated steel.

Another example is "Tin Alloy" announced by Jones & Laughlin Steel Corporation of U.S. This is prepared by thinly coating a steel strip with tin to a thickness of about 0.6 $g/m^2$ and effecting tin fusion or reflow followed by a conventional chromate treatment. Unfortunately, rust resistance and lacquer adhesion are insufficient.

In general, can-forming steel sheets intended for electric resistance welding are required to exhibit improved weldability and corrosion resistance after lacquering. These requirements will be explained in detail. There must be a proper welding electric current range within which a weld zone having sufficient weld strength is provided at the end of welding without any weld defects such as so-called "splashes". Since welded cans are filled with foodstuffs after lacquer coating, the underlying steel must have sufficient adhesion to lacquer to take full advantage of the corrosion prevention of the lacquer film. Furthermore, despite defects unavoidably occurring in a lacquer film, the improved corrosion resistance of the underlying steel itself prevents corrosion from proceeding.

SUMMARY OF THE INVENTION

It is therefore an object of the present invention to provide a process for preparing a surface-treated steel strip suitable for electric resistance welding which is free of the above mentioned drawbacks and fulfills the requirements for welded food cans.

According to a first aspect of the present invention, there is provided a process for preparing a surface-treated steel strip adapted for electric resistance welding, comprising the steps of forming a first layer of iron-nickel alloy on a steel strip, said first layer having a weight ratio of Ni/(Fe+Ni) in the range between 0.02 and 0.50 and a thickness of 10 to 5,000 angstroms, forming a second layer of tin or iron-tin-nickel alloy on said first layer by tin plating to a coating weight of 0.1 to 1 $g/m^2$ of tin and optionally, causing the tin to reflow, and forming a third layer on said second layer by effecting an electrolytic chromate treatment, said third layer consisting essentially of metallic chromium and hydrated chromium oxide in a total amount of 5 to 20 $mg/m^2$ calculated as elemental chromium.

According to a second aspect of the present invention, the electrolytic chromate treatment is controlled such that the following relationships:

$2 \leq X$ and
$5 \leq X+Y \leq 20$ are met provided that X represents the amount of metallic chromium in the third layer and Y represents the amount of hydrated chromium oxide in the third layer calculated as elemental chromium, both expressed in mg per square meter.

BRIEF DESCRIPTION OF THE DRAWINGS

FIG. 1 is an electron photomicrograph showing the structure of an iron-tin alloy layer on conventional tinplate;

FIG. 2 is an electron photomicrograph showing the structure of an iron-tin-nickel alloy of a thinly coated tinplate according to the present invention.

DETAILED DESCRIPTION OF THE INVENTION

Figure 3:
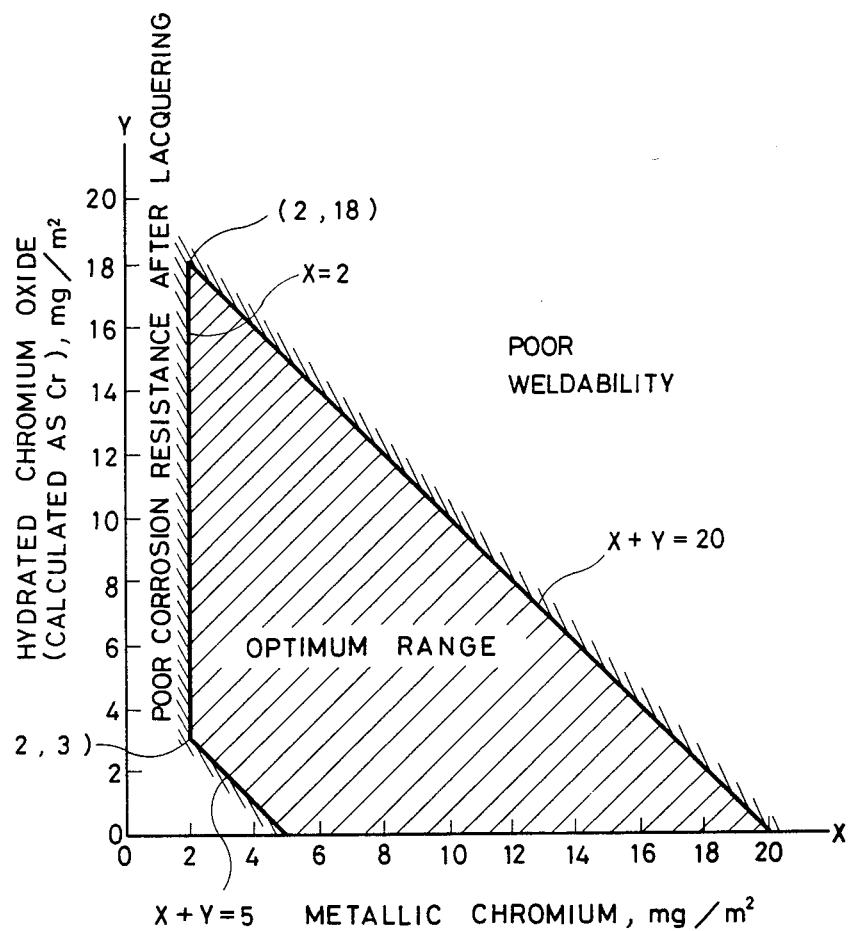
FIG. 3 is a diagram showing how the amounts of metallic chromium and hydrated chromium oxide (calculated as chromium) in chromate films affect weldability and corrosion resistance after lacquering.

Making extensive investigations on the weldability and corrosion resistance after lacquering of welded can-forming steel plates, particularly thinly coated tinplates, the inventors have found that weldability remains satisfactory as long as the quantity of a hydrated chromium oxide film does not exceed a certain limit, but corrosion resistance is unsatisfactory within this limit. On the other hand, as the quantity of a hydrated chromium oxide film increases, corrosion resistance is improved at the sacrifice of weldability, losing the optimum welding range. If the amount of tin coated is limited, to as little as 1 g/m² or less for economic reasons, steel sheets satisfying weldability and corrosion resistance after lacquering cannot be prepared by merely modifying a conventional tin-plating process so as to control the quantity of hydrated chromium oxide.

Continuing further investigation on techniques capable of improving corrosion resistance of tinplates other than the chromate treatment, the inventors have found that an iron-tin alloy layer formed by a tin fusion or reflow treatment is improved in corrosion resistance by itself and scarcely soluble in foodstuffs with which cans are filled, for example, fruit juice. Tinplates prepared by conventional techniques, however, have alloy layers containing many interstices as demonstrated by the electron photomicrograph of FIG. 1 and consequently, such an alloy layer is less effective in protecting the underlying steel.

In order to modify such an alloy layer to improve corrosion resistance, Japanese Patent Application No. 57-200592 discloses a "process for preparing surface-treated steel strips for forming welded cans", comprising nickel plating followed by annealing to cause the nickel to be partially or entirely diffused. This process is, however, inconsistent in attainment of corrosion resistance. Some products are satisfactory, but some are rather impaired in corrosion resistance. This process does not always provide sufficient corrosion resistance.

The inventors examined why the previously proposed process was unsatisfactory. Using an ion mass microanalyzer (IMMA), precise analysis was made on the chemical composition of a nickel-diffused surface layer on steel. It has been found that complete alloying of iron with nickel is essential to improve corrosion resistance. Corrosion resistance is impaired if part of the nickel is left unalloyed. Even when complete alloying is achieved, the proportion of iron and nickel must fall within the optimum range in order to provide sufficient corrosion resistance. On the basis of this novel finding, experiments have been repeatedly made to complete the present invention.

According to the process of the present invention, a surface-treated steel strip suitable for electric resistance welding is prepared by the steps of forming a first layer of iron-nickel alloy on a steel strip, forming a second layer of iron-tin-nickel alloy by depositing tin on the first layer in an amount of 0.1 to 1 g/m² and causing the tin to reflow, and forming a third layer of metallic chromium and hydrated chromium oxide on the second layer by effecting an electrolytic chromate treatment.

At the outset, the first layer of an iron-nickel alloy may be formed by any one of the following procedures in a currently industrially acceptable manner.

(a) A steel strip is plated with nickel followed by annealing.

(b) A steel strip is plated with an iron-nickel alloy followed by annealing.

(c) A steel strip is plated with an iron-nickel alloy. These procedures may be used alone or in a combination of two or more. These procedures allow an iron-nickel alloy layer to be formed whose composition varies in the direction of its depth.

The iron-nickel alloy layer itself has improved corrosion resistance and thus greatly contributes to an improvement in the corrosion resistance of the surface-treated steel strip according to the present invention. According to one aspect of the present invention tin is deposited on the first layer followed by a tin reflow treatment to thereby form a second layer of an iron-tin-nickel alloy. The resultant dense iron-tin-nickel alloy layer completely covers the first layer and the underlying steel, further improving corrosion resistance. The electron photomicrograph of FIG. 2 shows the structure of an iron-tin-nickel alloy layer of a thinly coated tin plate exhibiting improved corrosion resistance. It has been found that corrosion resistance is improved to the maximum when the composition of the first layer has a weight ratio of Ni/(Fe+Ni) in the range between 0.02 and 0.50. The lower limit of 0.02 is imposed on the weight ratio of Ni/(Fe+Ni) because a significant improvement in corrosion resistance is not obtained below this lower limit. The upper limit of 0.50 is imposed because the iron-tin-nickel alloy resulting from tin fusion or reflow becomes of rough crystal structure and provides a reduced percent coverage over the underlying steel, resulting in insufficient corrosion resistance. For this reason, the composition of the first layer of iron-nickel alloy formed on a steel strip is limited to a weight ratio of Ni/(Fe+Ni) in the range of between 0.02 and 0.50, and preferably between 0.05 and 0.20.

The thickness of the first layer is limited to 10 to 5,000 angstroms (Å). Thicknesses of less than 10 Å are apparently too small to achieve an improvement in corrosion resistance. Iron-nickel alloy layers formed beyond 5,000 Å thick are so hard and brittle that the iron-nickel alloy layer will crack during mechanical processing of the flange and bead of a can body to expose the underlying steel, detracting from corrosion resistance. For this reason, the first layer of iron-nickel alloy is limited to a thickness of 10 to 5,000 Å, and preferably 100 to 1,500 Å according to the present invention.

A tin plating may be deposited on the first layer of iron-nickel alloy by any desired one of conventional industrial techniques. Tin plating techniques typically use halide, ferrostan and alkaline baths. Any one may be selected among these tin plating baths in tin plating the first layer according to the present invention while plating conditions need not be specifically limited. The amount of tin plated should be limited to the range of 0.1 to 1 g/m². Tin plating to less than 0.1 g/m² cannot fully cover the first layer and is difficult to subsequently yield a second dense layer of iron-tin-nickel caused by tin reflow treatment and effective for corrosion resistance, leading to insufficient weldability and corrosion resistance. With the increasing amount of tin plated, weldability and corrosion resistance are increased. If the amount of tin plated exceeds 1 g/m², irrespective of further improvements in weldability and corrosion resistance, the cost of manufacture becomes too high to meet the economic requirement for welded can-forming steel. For this reason, the tin plated on the first layer is limited to a build-up of 0.1 to 1 g/m², and preferably 0.3 to 0.6 g/m² according to the present invention.

According to a first embodiment of the present invention, a tin fusion or reflow treatment is carried out at the end of tin plating to form a second layer of iron-tin-nickel alloy. The tin reflow may be effected by heating to above the melting point of tin, for example, by electric resistance heating, induction heating, external heating and other conventional techniques. The desired quality is achievable by any of these techniques. This second layer is a pinhole-free uniform coating which fully protects the underlying steel and contributes to a substantial part of improvement in corrosion resistance. Unlike iron-tin alloy layers formed by tin reflow in conventional tinplate manufacture, the second layer of iron-tin-nickel alloy according to the present invention is highly resistant to corrosive attack by can contents or foodstuffs due to the inclusion of nickel. The iron-tin-nickel alloy layer resulting from tin reflow treatment is formed by a tin reflow treatment in a necessary and sufficient amount (or thickness) as long as the amount of tin plated previously is within the above-specified range of 0.1 to 1 g/m$^2$. Within this range of tin plating, alloying a part or all of the tin plating does not affect weldability and corrosion resistance.

On the second layer of iron-tin-nickel alloy thus formed by tin plating followed by reflowing, is formed a third layer consisting essentially of metallic chromium and hydrated chromium oxide by effecting an electrolytic chromate treatment. The third layer is the top coat which is required to maintain firm adhesion of lacquer, but can adversely affect weldability if it is too thick.

The chromate treatment may be carried out through cathodic electrolysis in a solution containing one or more of chromic acid, chromates, and dichromates. According to the present invention, the total amount of metallic chromium and hydrated chromium oxide is limited to the range of 5 to 20 mg/m$^2$ calculated as elemental chromium. With total amounts of less than 5 mg/m$^2$, adhesion of lacquer to the chromated layer is poor so that a lacquer film may be readily separated at the location of defects therein, to the detriment of the corrosion resistance of the lacquer film. If the chromated layer is more than 20 mg/m$^2$ (calculated as elemental chromium) the increased electric resistance of the chromated layer becomes a bar against welding. For this reason, the third chromated layer according to the present invention should have a combined chromium content of 5 to 20 mg/m$^2$, and preferably 7 to 15 mg/m$^2$.

Because of the three layer structure comprising the first layer of iron-nickel alloy, the second layer of iron-tin-nickel alloy formed by tin plating on the first layer followed by tin reflowing, and the third chromate layer on the second layer, the surface-treated steel strips or sheets according to the first embodiment of the present invention exhibit improved weldability and corrosion resistance after lacquering and are thus very suitable to form food cans by electric resistance welding.

The process according to the first embodiment of the present invention is successful in providing thinly coated tin plates having improved weldability and corrosion resistance. Through a series of experiments, we have found that among steel strips surface treated by the process according to the first embodiment of the present invention, some are not satisfactory in corrosion resistance when combined with certain can contents or foodstuffs. Continuing further research, we have found that corrosion resistance changes depending on the composition of the third layer, i.e., chromate film and that the tin reflow treatment is not necessarily needed to form the second layer. The former finding will be described in more detail. Although the combined chromium content in the third layer consisting essentially of metallic chromium and hydrated chromium oxide is limited in the first embodiment, we have found that those treated steel strips showing poor corrosion resistance have a chromate film containing a smaller amount of metallic chromium.

The corrosion resistance after lacquering and weldability of surface-treated steel strips were examined by controlling the final electrolytic chromate treatment to change the respective amounts of metallic chromium and hydrated chromium oxide in the chromate film. The results are plotted in the graph of FIG. 3, in which X represents the amount of metallic chromium in the third chromate layer and Y represents the amount of hydrated chromium oxide in the third chromate layer calculated as elemental chromium, both expressed in mg/m$^2$. In FIG. 3, the optimum region is a region in which both corrosion resistance after lacquering and weldability are excellent. When the amount of metallic chromium (X) is more than 2 mg/m$^2$, corrosion resistance was excellent. When the amount of metallic chromium (X) is less than 2 mg/m$^2$, some samples showed poor corrosion resistance. It is believed that the adhesion of a chromate film to lacquer increases with the increasing amount of metallic chromium in the chromate film, particularly at a proportion of metallic chromium of more than 2 mg/m$^2$ (inclusive). As seen from FIG. 3, with respect to the total amount of chromium in the chromate film consisting essentially of metallic chromium and hydrated chromium oxide, that is, X+Y, corrosion resistance is poor below 5 mg/m$^2$ whereas weldability becomes unsatisfactory above 20 mg/m$^2$. The range defined by $5 \leq X+Y \leq 20$ is an optimum range in which both corrosion resistance and weldability are excellent.

According to the second embodiment of the present invention, the following relationships should be met:
$2 \leq X$ and
$5 \leq X+Y \leq 20$
where X and Y are as defined above.

Next, the tin reflow treatment will be discussed. In the first embodiment, the formation of the second layer of Fe-Sn-Ni alloy depends on the tin reflow treatment. However, when corrosion resistance after lacquering is considered, a tin plating is converted into an iron-nickel-tin alloy during baking of the lacquer and this subsequently formed alloy layer is equal in effect to the alloy layer previously formed by reflowing. Accordingly, the tin reflow treatment is optional in the step of forming the second layer.

Because of the three layer structure comprising the first layer of iron-nickel alloy, the second layer of tin or iron-tin-nickel alloy on the first layer, and the third layer consisting of chromate film consisting essentially of controlled amounts of metallic chromium and hydrated chromium oxide on the second layer, the surface-treated steel strips or sheets according to the second embodiment of the present invention consistently exhibit improved weldability and corrosion resistance after lacquering and are thus highly suitable to form food cans by electric resistance welding.

Examples of the present invention are given by way of illustration and not by way of limitation.

EXAMPLE I

A conventional steel strip intended for electroplating was cold rolled to a thickness of 0.2 mm and electrolytically cleaned in a usual manner before it was cut into samples designated Nos. 1 to 14. Surface-treated steel samples were prepared from these steel samples by the process according to the present invention and by similar processes in which at least one parameter did not fulfill the requirements of the present invention. The samples were then tested for weldability and corrosion resistance after lacquering.

A. Formation of the First Layer of Iron-Nickel Alloy

The first layer of iron-nickel alloy was formed on steel samples by one or a combination of two or more of the following procedures:
(a) nickel plating followed by annealing,
(b) plating of an iron-nickel alloy followed by annealing, and
(c) plating of an iron-nickel alloy.

For instance, a steel strip was cold rolled to a thickness of 0.2 mm and electrolytically cleaned in a sodium hydroxide solution. The steel strip was then plated with nickel or an iron-nickel alloy and annealed in an atmosphere of 10% $H_2$+90% $N_2$, that is, the so-called HNX gas atmosphere. The thus annealed strip was further electorolytically cleaned in a caustic soda solution, pickled in a sulfuric acid solution, and then plated with an iron-nickel alloy. Typical examples of the plating baths used had the following compositions.

| (a) Nickel plating bath | |
|---|---|
| Nickel sulfate | 250 g/l |
| Nickel chloride | 45 g/l |
| Boric acid | 30 g/l |

| (b) Iron-nickel alloy plating bath | |
|---|---|
| Iron chloride | 20–230 g/l |
| Nickel chloride | 30–300 g/l |
| Boric acid | 25 g/l |

A first layer of iron-nickel alloy was formed on the surface of a steel strip in this way. For sample Nos. 1 to 7 according to the present invention, the first layers formed had a weight ratio of Ni/(Fe+Ni) in the range between 0.02 and 0.50 and a thickness of 10 to 5,000 Å as shown in Table 1, satisfying the requirements of the invention. Among samples for comparison purpose, sample Nos. 9 and 11 had a weight ratio of Ni/(Fe+Ni) of 0.01 and 0.85, respectively, not satisfying the requirement of the invention. Sample No. 10 had a first layer whose thickness is as great as 6,000 Å, exceeding the requirement of the invention.

It is to be noted that the composition and thickness of the first layer of iron-nickel alloy shown in Table 1 were measured by IMMA.

B. Formation of the Second Layer of Iron-Tin-Nickel Alloy

Tin was deposited on the first layer and a tin fusion or reflow treatment was carried out to form a second layer of an iron-tin-nickel alloy. A typical example of the tin plating bath used is a halide bath having the following composition:

| Tin-plating halide bath | |
|---|---|
| Stannous chloride | 60 g/l |
| Acidic sodium fluoride | 20 g/l |
| Sodium fluoride | 50 g/l |
| Sodium chloride | 60 g/l |

In this step, sample Nos. 1 to 7 according to the present invention had tin plated to a coating weight in the range of 0.1 to 1 g/m², i.e., 100–1,000 mg/m², satisfying the requirement of the invention. Among samples for comparison purpose, sample No. 13 had tin plated to a coating weight as little as 80 mg/m² and sample No. 14 had tin plated to as much as 2,800 mg/m², not satisfying the requirement of the invention. It is to be noted that sample No. 14 having tin thickly coated corresponds to #25 tinplate which is the most thinly coated tinplate among currently available tinplates.

C. Formation of the Third Layer of Metallic Chromium and Hydrated Chromium Oxide by Electrolytic Chromate Treatment The tin-plated steel samples were subjected to cathodic electrolysis in a chromate treating bath which typically had the following composition.

| Chromate treating bath | |
|---|---|
| Chromic anhydride | 5 g/l |
| Sodium dichromate | 20 g/l |
| Sulfuric acid | 0.1 g/l |

With respect to the total amount of metallic chromium and hydrated chromium oxide in the third layer formed by this electrolytic chromate treatment, sample Nos. 1 to 7 according to the invention all satisfied the requirement of the invention in the range of 5 to 20 mg/m² calculated as metallic chromium as shown in Table 1. Among samples for comparison purpose, sample No. 8 had a total chromium amount as small as 4 mg/m² and sample No. 12 had a total chromium amount as large as 22 mg/m², not satisfying the requirement of the invention.

Test specimens were cut from the thus obtained samples to examine their properties.

Weldability and corrosion resistance after lacquer coating were evaluated as follows.

Weldability

A copper wire having a diameter of about 1.5 mm was used as a welding electrode. A specimen was rounded to place one edge on the mating edge under pressure. While the copper wire was moved along the overlapping edge, electric resistance welding was conducted at a welding rate of 40 m per minute. Optimum ranges for electric current and pressure applied during welding were sought within which a weld zone having sufficient strength could be produced without so-called splashes. The presence of these ranges ensures the weldability of specimens.

The strength of a weld zone was determined by the so-called peel test in which a V-shaped notch was cut in one end of the rounded specimen across the weld line. The bevelled portion of the overlapping edge was pulled with a pliers toward the other end. The strength required is such that the specimen may not be fractured at the weld in this process.

Corrosion Resistance After Lacquering

A specimen was coated with an epoxy-phenol lacquer to a thickness of 4.5 microns (μm) and cuts were formed through the lacquer film to the underlying steel substrate with a fine cutting knife. The specimen was drawn to 5 mm through an Erichsen machine.

The thus treated specimen was evaluated for corrosion resistance by immersing it for 96 hours in a deaerated solution of 1.5% citric acid and 1.5% salt water in 1:1 admixture. The steel underlying the lacquer film was evaluated for corrosion by determining the distance of the lacquer film separated from the cross-cut and the quantity of iron dissolved out from the cross-cut.

The results of evaluation on welded specimens and lacquer coated specimens originating from sample Nos. 1 and 14 are shown in Table 1. Symbols used to evaluate weldability and corrosion resistance after lacquer coating in Table 1 have the following meanings.

| | Weldability |
|---|---|
| Symbol | Optimum welding range |
| O | present |
| X | absent |

| | Corrosion resistance after laquer coating |
|---|---|
| Symbol | Maximum distance of paint film separated from cross-cut |
| O | 0 |
| Δ | 0–0.5 mm |
| X | more than 0.5 mm | surface-treated steel and the improved corrosion resistance to which the second layer particularly contributes. Conversely, comparative samples which do not satisfy at least one of the requirements of the invention are inferior to the samples of the invention in weldability and/or corrosion resistance, and particularly, are prone to considerable corrosion at cross-cuts.

As seen from the above example, since the surface-treated steel strip or sheet suitable for electric resistance welding according to the first embodiment of the present invention is prepared by forming a first layer of iron-nickel alloy on a steel strip, depositing tin on the first layer, causing the tin to reflow to form a second layer of iron-tin-nickel alloy, and effecting an electrolytic chromate treatment to form a third chromated layer on the second layer, thereby forming a surface structure of multi-layer construction while specifically controlling the composition and thickness of the first layer and the build-ups of the second and third layers, weldability and corrosion resistance after lacquering are significantly improved as well as the adhesion of a lacquer film to the steel. Thus, the surface-treated steel strip or sheet according to the present invention satisfies all the above-mentioned requirements for steel material from which welded food cans are formed.

TABLE 1

| Sample No. | Iron-nickel alloy layer | | | Tin Coating Weight $(mg/m^2)$ | Total Cr in third layer $(mg/m^2)$ | Weldability (optimum welding range) | Corrosion resistance after lacquering | |
|---|---|---|---|---|---|---|---|---|
| | Procedure | Ni/(Fe + Ni) | Thickness (Å) | | | | Lacquer film Separation | Fe dissolved out (mg) |
| 1 | Fe—Ni alloy plating | 0.40 | 600 | 200 | 10 | o | o | 3 |
| 2 | Fe—Ni alloy plating | 0.03 | 20 | 500 | 18 | o | o | 2 |
| 3 | Ni plating/annealing | 0.02–0.3 | 1000 | 150 | 6 | o | o | 4 |
| 4 | Ni plating/annealing | 0.02–0.2 | 700 | 650 | 12 | o | o | 3 |
| 5 | Fe—Ni alloy plating/ annealing | 0.02–0.25 | 4000 | 350 | 9 | o | o | 3 |
| 6 | Fe—Ni alloy plating/ annealing | 0.02–0.45 | 2500 | 420 | 15 | o | o | 2 |
| 7 | Ni plating/annealing/ Fe—Ni alloy plating | 0.02–0.3 | 100 | 550 | 8 | o | o | 4 |
| 8* | Fe—Ni alloy plating | 0.2 | 800 | 900 | 4 | o | x | 175 |
| 9* | Fe—Ni alloy plating | 0.01 | 150 | 250 | 18 | x | Δ | 200 |
| 10* | Fe—Ni alloy plating/ annealing/ Fe—Ni alloy plating | 0.02–0.2 | 6000 | 380 | 12 | o | Δ | 180 |
| 11* | Fe—Ni alloy plating/ annealing/ Fe—Ni alloy plating | 0.85 | 1000 | 540 | 15 | o | x | 190 |
| 12* | Ni plating/annealing | 0.02–0.2 | 1000 | 600 | 22 | x | o | 3 |
| 13* | Ni plating/annealing | 0.02–0.3 | 300 | 80 | 12 | o | Δ | 270 |
| 14* | — | — | — | 2800 | 6 | o | Δ | 50 |

*comparative examples

In Table 1, for comparative sample Nos. 8–14, those numerical values not satisfying the requirements of the invention are underlined. As seen from the results of weldability and corrosion resistance after lacquering of surface-treated steel samples shown in Table 1, sample Nos. 1 to 7 satisfying all the requirements of the invention exhibit superior weldability and corrosion resistance after lacquering as compared with, for example, sample No. 14 corresponding to #25 tinplate although the amount of tin plated is less than one third of that of sample No. 14. These improvements are based on the surface structure of multi-layer construction comprising the first layer of iron-nickel alloy, the second layer of iron-tin-nickel alloy which is uniform and free of pinholes, and the third layer formed by controlled chromate treatment. Particularly, the quantity of iron dissolved out from a cross-cut is in the range between 2 and 4 mg which is in contrast to comparative samples, proving the improved adhesion of a lacquer film to

EXAMPLE II

A conventional steel strip intended for electroplating was cold rolled to a thickness of 0.2 mm and electrolytically cleaned in a usual manner before it was cut into samples designated Nos. 21 to 34. Surface-treated steel samples were prepared from these steel samples by the process according to the present invention (Nos. 21–25) and by similar processes in which at least one parameter did not fulfill the requirements of the present invention (Nos. 26–34). The samples were then tested for weldability and corrosion resistance after lacquering.

A. Formation of the First Layer of Iron-Nickel Alloy

The first layer of iron-nickel alloy was formed on steel samples by one or a combination of two or more of the following procedures:

(a) nickel plating followed by annealing, (b) plating of an iron-nickel alloy followed by annealing, and (c) plating of an iron-nickel alloy.

For instance, a steel strip was cold rolled to a thickness of 0.2 mm and electrolytically cleaned in a sodium hydroxide solution. The steel strip was then plated with nickel or an iron-nickel alloy and annealed in an atmosphere of 10% $H_2$ + 90% $N_2$, that is, the so-called HNX gas atmosphere. The thus annealed strip was further electrolytically cleaned in a sodium hydroxide solution, pickled in a sulfuric acid solution, and then plated with an iron-nickel alloy.

Typical examples of the plating baths used had the following compositions.

| (a) Nickel plating bath | |
|---|---|
| Nickel sulfate | 250 g/l |
| Nickel chloride | 45 g/l |
| Boric acid | 30 g/l |

| (b) Iron-nickel alloy plating bath | |
|---|---|
| Iron chloride | 20–230 g/l |
| Nickel chloride | 30–300 g/l |
| Boric acid | 25 g/l |

A first layer of iron-nickel alloy was formed on the surface of a steel strip in this way. For sample Nos. 21 to 25 according to the present invention, the first layers formed had a weight ratio of Ni/(Fe+Ni) in the range between 0.02 and 0.50 and a thickness of 10 to 5,000 Å as shown in Table 1, satisfying the requirements of the invention. Among samples for comparison purposes, sample Nos. 30, 31, and 32 had a weight ratio of Ni/(Fe+Ni) of 0.01, 0, and 0.85, respectively, not satisfying the requirement of the invention. Sample No. 33 had a first layer whose thickness is as great as 6,000 Å, exceeding the requirement of the invention.

It is to be noted that the composition and thickness of the first layer of iron-nickel alloy shown in Table 2 were measured by IMMA.

B. Formation of the Second Layer

Tin is deposited on the first layer to form a second layer of tin thereon. Optionally, tin plating is followed by a tin fusion or reflow treatment to form a second layer of iron-tin-nickel alloy on the first layer. The tin reflowing is not necessarily needed because conversion into such an alloy layer will take place during subsequent baking of lacquer. The corrosion resistance after lacquering is the corrosion resistance of steel at the end of lacquering, that is, at the end of lacquer baking. For this reason, the previous tin reflowing is not necessarily needed. A significant improvement in corrosion resistance is achievable when the second layer is formed simply by tin plating without reflowing and a corresponding alloy layer is subsequently formed during baking of lacquer. A typical example of the tin plating bath used is a halide bath having the following composition:

| Tin-plating halide bath | |
|---|---|
| Stannous chloride | 60 g/l |
| Acidic sodium fluoride | 20 g/l |
| Sodium fluoride | 50 g/l |

| —continued | |
|---|---|
| Tin-plating halide bath | |
| Sodium chloride | 60 g/l |

In this step, sample Nos. 21 to 25 according to the present invention had tin plated to a coating weight in the range of 0.1 to 1 g/m², i.e., 100–1,000 mg/m², satisfying the requirement of the invention. Among samples for comparison purposes, sample No. 34 had tin plated to a coating weight as little as 50 mg/m² and sample No. 31 had tin plated to as much as 2,800 mg/m², not satisfying the requirement of the invention. It is to be noted that sample No. 31 having tin thickly coated corresponds to #25 tinplate which is the most thinly coated tinplate among currently available tinplates.

C. Formation of the Third Layer of Metallic Chromium and Hydrated Chromium Oxide by Electrolytic Chromate Treatment The tin-plated steel samples were subjected to cathodic electrolysis in chromate treating baths which typically had the following compositions.

| Bath I | |
|---|---|
| $CrO_3$ | 20 g/l |
| $Na_2Cr_2O_7$ | 5 g/l |
| $H_2SO_4$ | 0.2 g/l |
| Bath II | |
| $CrO_3$ | 15 g/l |
| NaF | 1.5 g/l |
| Bath III | |
| $CrO_3$ | 60 g/l |
| Bath IV | |
| $Na_2Cr_2O_7$ | 55 g/l |
| $Cr_2O_3$ | 5 g/l |

With respect to the total amount (X+Y) of metallic chromium and hydrated chromium oxide in the third layer formed by this electrolyric chromate treatment, sample Nos. 21 to 25 according to the invention all satisfied the requirement of the invention that the amount of metallic chromium X be equal to or more than 2 mg/m² and the total chromium amount (X+Y) is in the range between 5 and 20 mg/m² (inclusive) as shown in Table 2. Among samples for comparison purposes, sample Nos. 22, 27, and 31 had a metallic chromium amount as small as 0, 1, and 0 mg/m² and sample Nos. 28 and 29 had a total chromium amount as large as 25 and 30 mg/m², not satisfying the requirement of the invention.

Test specimens were cut from the thus obtained samples to examine their properties.

Weldability and corrosion resistance after lacquering were evaluated as follows.

Weldability

A copper wire having a diameter of about 1.5 mm was used as a welding electrode. A specimen was rounded to place one edge on the mating edge under pressure. While the copper wire was moved along the overlapping edge, electric resistance welding was conducted at a welding rate of 40 m per minute. Optimum ranges for electric current and pressure applied during welding were sought within which a weld zone having sufficient strength could be produced without so-called splashes. The presence of these ranges ensures the weldability of specimens.

The strength of a weld zone was determined by the so-called peel test in which a V-shaped notch was cut in one end of the rounded specimen across the weld line. The bevelled portion of the overlapping edge was pulled with a pliers toward the other end. The strength required is such that the specimen may not be fractured at the weld in this process.

Corrosion Resistance After Lacquer Coating

A specimen was coated on one surface with an epoxy-phenol lacquer to a coating weight of 50 mg/dm$^2$ and sealed at the edges and opposite surface.

The thus treated specimen was evaluated for corrosion resistance by immersing it totally in a test solution and then keeping it half immersed at 55° C. for 18 days. After 18-day immersion, the specimen was removed from the solution and the upper half of the specimen which had been above the solution level was observed for corrosion under the lacquer film.

The test solutions used were commercially available grapefruit juice, tomato juice, and milk.

The results of evaluation on welded specimens and lacquered specimens originating from samples Nos. 21 to 34 are shown in Table 2. Symbols used to evaluate weldability and corrosion resistance after lacquering in Table 2 have the following meanings.

| | Weldability |
|---|---|
| Symbol | Optimum welding range |
| O | present |
| X | absent |

| | Corrosion resistance after lacquering |
|---|---|
| Symbol | Blister of lacquer film on upper half of specimen above solution |
| O | no blister |
| Δ | some blister |
| X | much blister |

In Table 2, for comparative samples Nos. 26–34, those numerical values not satisfying the requirements of the invention are underlined. As seen from the results of weldability and corrosion resistance after lacquering of surface-treated steel samples shown in Table 1, sample Nos. 21 to 25 satisfying all the requirements of the invention exhibit superior weldability and corrosion resistance after lacquer coating as compared with, for example, sample No. 31 corresponding to #25 tinplate although the amount of tin plated is less than one third of that of sample No. 31. These improvements are based on the surface structure of multi-layer construction comprising the first layer of iron-nickel alloy, the second layer of iron-tin-nickel alloy which is uniform and free of a pinhole, and the third layer formed by controlled chromate treatment. Conversely, comparative samples which do not satisfy at least one of the requirements of the invention are inferior to the samples of the invention in weldability and/or corrosion resistance.

As seen from the above example, since the surface-treated steel strip or sheet suitable for electric resistance welding according to the present invention is prepared by forming a first layer of iron-nickel alloy on a steel strip, depositing tin on the first layer to form a second layer of tin, optionally causing the tin to reflow to form a (converted) second layer of iron-tin-nickel alloy, and effecting an electrolytic chromate treatment to form a third chromated layer on the second layer, thereby forming a surface structure of multi-layer construction while specifically controlling the composition and thickness of the first layer and the build-ups of the second and third layers, weldability and corrosion resistance after lacquering are significantly improved as well as the adhesion of a lacquer film to the steel. Thus, the surface-treated steel strip or sheet according to the present invention satisfies all the above-mentioned requirements for steel material from which welded food cans are formed.

What is claimed is:

TABLE 2

| Sample No. | Iron Nickel alloy layer | | | Tin Coating Weight (mg/m$^2$) | Tin reflow | Chromate treatment | | | Weldability | Corrosion resistance after lacquering in | | |
|---|---|---|---|---|---|---|---|---|---|---|---|---|
| | Procedure | Ni/(Fe + Ni) | Thickness (Å) | | | Bath | X | Y | | Grapefruit Juice | Tomato Juice | Milk |
| 21 | Ni plating/annealing | 0.02–0.2 | 800 | 600 | R | I | 2 | 8 | o | o | o | o |
| 22 | Ni plating/annealing | 0.02–0.2 | 800 | 620 | R | II | 5 | 10 | o | o | o | o |
| 23 | Fe—Ni alloy plating | 0.03 | 40 | 350 | N | I | 8 | 16 | o | o | o | o |
| 24 | Fe—Ni alloy plating/ annealing | 0.02–0.3 | 3000 | 500 | R | II | 6 | 14 | o | o | o | o |
| 25 | Ni plating/annealing/ Fe—Ni alloy plating | 0.02–0.4 | 50 | 600 | N | II | 3 | 10 | o | o | o | o |
| 26* | Ni plating/annealing | 0.02–0.2 | 800 | 740 | R | III | 0 | 10 | o | o | Δ | x |
| 27* | Ni plating/annealing | 0.02–0.2 | 800 | 650 | R | I | 1 | 12 | o | o | o | Δ |
| 28* | Ni plating/annealing | 0.02–0.2 | 800 | 700 | N | II | 10 | 25 | x | o | o | o |
| 29* | Ni plating/annealing | 0.02–0.2 | 800 | 800 | R | III | 0 | 30 | x | o | x | x |
| 30* | Fe—Ni alloy plating | 0.01 | 150 | 500 | R | II | 6 | 12 | o | o | Δ | Δ |
| 31* | — | — | — | 2800 | R | IV | 0 | 6 | o | o | Δ | Δ |
| 32* | Fe—Ni alloy plating/ annealing/ Fe—Ni alloy plating | 0.85 | 1000 | 500 | R | II | 5 | 11 | x | o | o | Δ |
| 33* | Fe—Ni alloy plating/ annealing/ Fe—Ni alloy plating | 0.02–0.2 | 6000 | 400 | R | I | 4 | 13 | o | o | o | Δ |
| 34* | Fe—Ni alloy plating | 0.03 | 40 | 50 | R | I | 5 | 14 | x | Δ | x | x |

*comparative examples
R = reflow
N = no reflow

1. Process for preparing a surface-treated steel strip adapted for electric resistance welding, comprising the steps of forming a first layer of iron-nickel alloy on a steel strip, said first layer having a weight ratio of Ni/(Fe+Ni) in the range between 0.02 and 0.50 and a thickness of 10 to 5,000 angstroms, forming a second layer of tin or iron-tin-nickel alloy on said first layer by tin plating to a coating weight of 0.1 to 1 g/m$^2$ of tin and forming a third layer on said second layer by effecting an electrolytic chromate treatment, said third layer consisting essentially of metallic chromium and hydrated chromium oxide in a total amount of 5 to 20 mg/m$^2$ calculated as elemental chromium.

2. The process according to claim 1 wherein said first layer of iron-nickel alloy is formed by (1) plating the steel strip with nickel followed by annealing, (2) plating the steel strip with an iron-nickel alloy followed by annealing, (3) plating the steel strip with an iron-nickel alloy, or (4) a combination of the foregoings.

3. The process according to claim 1 wherein said first layer of iron-nickel alloy has a weight ratio of Ni/(Fe+Ni) in the range between 0.05 and 0.20.

4. The process according to claim 1 or wherein said first layer of iron-nickel alloy has a thickness of 100 to 1,500 angstroms.

5. The process according to claim 1 wherein tin plating is effected in a bath selected from halide baths, ferrostan baths, and alkaline baths containing an effective concentration of tin.

6. The process according to claim 1 wherein tin plating is effected to a coating weight of 0.3 to 0.6 g/m$^2$ of tin.

7. The process according to claim 1 wherein tin reflowing is effected by heating.

8. The process according to claim 1 wherein the electrolytic chromate treatment is cathodic electrolysis in a bath containing at least one selected from chromic acid, chromates, and dichromates.

9. The process according to claim 1 wherein said third layer consists essentially of metallic chromium and hydrated chromium oxide in a total amount of 7 to 15 mg/m$^2$ calculated as elemental chromium.

10. The process according to claim 1 wherein the electrolytic chromate treatment is controlled such that at least 2 mg/m$^2$ of metallic chromium is present in the third layer.

11. The process according to claim 1, and causing the tin to reflow after formation of said second layer.

12. Process for preparing a surface-treated steel strip adapted for electric resistance welding, comprising the steps of forming a first layer of iron-nickel alloy on a steel strip, said first layer having a weight ratio of Ni/(Fe+Ni) in the range between 0.02 and 0.50 and a thickness of 10 to 5,000 angstroms, forming a second layer of tin or iron-tin-nickel alloy on said first layer by tin plating to a coating weight of 0.1 to 1 g/m$^2$ of tin, and forming a third layer on said second layer by effecting an electrolytic chromate treatment, said third layer consisting essentially of metallic chromium and hydrated chromium oxide, wherein the following relationships:

$2 \leq X$ and
$5 \leq X + Y \leq 20$ are met provided that X represents the amount of metallic chromium in the third layer and Y represents the amount of hydrated chromium oxide in the third layer calculated as elemental chromium, both expressed in mg/m$^2$.

13. The process according to claim 12 wherein said first layer of iron-nickel alloy is formed by (1) plating the steel strip with nickel followed by annealing, (2) plating the steel strip with an iron-nickel alloy followed by annealing, (3) plating the steel strip with an iron-nickel alloy, or (4) a combination of the foregoings.

14. The process according to claim 12 wherein said first layer of iron-nickel alloy has a weight ratio of Ni/(Fe+Ni) in the range between 0.05 and 0.20.

15. The process according to claim 12 wherein said first layer of iron-nickel alloy has a thickness of 100 to 1,500 angstroms.

16. The process according to claim 12 wherein tin plating is effected in a bath selected from halide baths, ferrostan baths, and alkaline baths containing an effective concentration of tin.

17. The process according to claim 12 wherein tin plating is effected to a coating weight of 0.3 to 0.6 g/m$^2$ of tin.

18. The process according to claim 12 wherein tin reflowing is effected by heating.

19. The process according to claim 12 wherein the electrolytic chromate treatment is cathodic electrolysis in a bath containing at least one selected from chromic acid, chromates, and dichromates.

20. The process according to claim 12 wherein said third layer consists essentially of metallic chromium and hydrated chromium oxide in a total amount of 7 to 15 mg/m$^2$ calculated as elemental chromium.

21. The process according to claim 12, and causing the tin to reflow after forming said second layer.

* * * * *